United States Patent [19]

Zak

[11] Patent Number: 4,891,723
[45] Date of Patent: Jan. 2, 1990

[54] MULTIPLE STAGE HEAT SHIELDING FOR TRANSDUCER SUPPORT ARM

[75] Inventor: Brian S. Zak, Bloomington, Minn.

[73] Assignee: Magnetic Peripherals Inc., Minneapolis, Minn.

[21] Appl. No.: 247,722

[22] Filed: Sep. 22, 1988

[51] Int. Cl.[4] ............................................. G11B 5/55
[52] U.S. Cl. .................................. 360/106; 360/97.03
[58] Field of Search ........... 360/106, 108, 97.02–97.04

[56] References Cited

U.S. PATENT DOCUMENTS

| | | |
|---|---|---|
| 4,402,025 | 8/1983 | Anderson et al. |
| 4,495,378 | 1/1985 | Dötzer et al. |
| 4,616,279 | 10/1986 | Poorman |
| 4,658,331 | 4/1987 | Berg |
| 4,745,502 | 5/1988 | Fasano ........................ 360/106 X |

Primary Examiner—A. J. Heinz
Attorney, Agent, or Firm—Edward P. Heller, III; Frederick W. Niebuhr

[57] ABSTRACT

A support means is disclosed for mounting an integrated circuit chip preamplifier with respect to an aluminum transducing head support arm in a magnetic disc drive. The support means includes two heat shields, each with an aluminum foil layer facing the preamplifier and a thermally insulative adhesive layer facing the rigid arm. The preamplifier is secured to the foil layer of the most adjacent heat shield with an electrically insulative but thermally conductive adhesive. The alternating thermally conductive and thermally insulative layers interfere with longitudinal heat transfer but allow lateral heat transfer to promote heat dissipation laterally outwardly of the support means, and thus substantially reduce thermal expansion of the support arm.

11 Claims, 2 Drawing Sheets

MULTIPLE STAGE HEAT SHIELDING FOR TRANSDUCER SUPPORT ARM

BACKGROUND OF THE INVENTION

This invention relates to apparatus for reading, writing and storing magnetic data, and more particularly to a means for mounting a tape-automated bonded preamplifier to the substantially rigid arm supporting a magnetic transducing head.

A well known technique for increasing the data storage capacity of magnetic disc drives is to provide a series of rotating discs in spaced apart, stacked relation, along with a matching series of transducing head and support arm assemblies disposed for either linear or rotary transducing head movement with respect to the recording surfaces of the discs. Typically, one of the head and arm assemblies reads servo or positioning information on one of the recording surfaces dedicated to storing positioning information, while the remaining recording surfaces and accompanying head and arm assemblies are used to read and record working data. The positioning transducer and surface are employed to guide the remaining transducing heads as they read and record data. This of course requires a stable positional relationship among the servo head and data heads.

A flexible electrical circuit normally is used to transmit the electrical pulses between each head and other circuitry in the disc drive. A preamplifier, usually an integrated circuit chip mounted with respect to the flexible circuit and transducer support arm, insures that signals of sufficient amplitude are provided at the head. The preamplifiers give rise to a problem, however, particularly when the transducer support arms are constructed of aluminum or other material with a relatively high coefficient of thermal expansion. In particular, heat generated by each preamplifier causes thermal expansion in its associated transducer support arm. The varying degrees of thermal expansion cause a variance in length among the support arms, resulting in misalignment of the transducing heads.

One known approach to counteract thermal expansion is to mount the preamplifier chip within a dual-in-line package (DIP), using the metal leads of the package to mount the package in spaced apart relation to the support arm. This is relatively expensive compared to other methods, for example tape-automated bonding, and is subject to severe spatial limitations in typical disc drives. Another approach, shown in U.S. Pat. No. 4,658,331 (Berg), attaches a chip to a plate with a thermally conductive epoxy adhesive. Elastomer pads maintain the plate and chip spaced apart from a circuit board, and the plate tends to conduct heat away from the circuit board. This support means is somewhat large and bulky in the spatially limited disc drive environment, and would interfere with the wire bonding of chip pads to the flex circuit.

Therefore, it is an object of the present invention to provide a means for thermally isolating a transducing head support arm from heat generated by a preamplifier mounted to the arm.

Another object is to provide a low cost manner of mounting a preamplifier to a transducer support arm that minimizes thermal expansion of the arm.

Yet another object is to provide a multiple-stage configuration for supporting a tape-automated bonded preamplifier chip with respect to a transducer support arm, particularly well suited for thermally isolating the arm and dissipating heat generated in the preamplifier.

SUMMARY OF THE INVENTION

To achieve these and other objects, there is provided a magnetic transducing apparatus including a substantially rigid transducer support arm movable with respect to a magnetic data recording surface, a magnetic transducing head mounted to the arm for movement with the arm and positioned for interaction with the recording surface, a flexible electrical circuit connected to the transducing head and to the integrated circuit and mounted with respect to the arm between the arm and the integrated circuit, and a means for mounting the integrated circuit to thermally isolate the integrated circuit from the arm and dissipate heat generated in the integrated circuit.

The mounting means include a plurality of mounting stages or layers cooperating to support the integrated circuit in longitudinally spaced apart relation to the transducer support arm. Each of the stages is disposed with its major dimensions substantially in a transverse plane. The stages include first and second thermally conductive foil stages between the integrated circuit and the flexible circuit. An electrically insulative and thermally conductive first adhesive stage is provided between the integrated circuit and the first foil stage, for bonding the integrated circuit and foil stage with respect to one another. A thermally insulative second adhesive stage, between the first and second foil stages, bonds the foil stages with respect to one another. A thermally and electrically insulative third adhesive stage is provided between the second foil stage and the flexible circuit, for bonding the second foil stage and flexible circuit.

A thermally insulative fourth adhesive stage, between the flexible circuit and transducer support arm, bonds the flexible circuit with respect to the arm.

Preferably, each of the stages is substantially uniform in its longitudinal dimensions, with the major dimensions of each stage being at least 100 times the associated longitudinal dimension. For example, the length and width of each stage can be on the order of one-half to one inch, with the thickness in the range of from 0.001 to 0.005 inch.

To facilitate manufacture of the mounting or support means, the fourth adhesive can be pressure and temperature sensitive and pre-applied to the flexible circuit, the third adhesive stage can be pressure and temperature sensitive as well and pre-applied in a semi-cured form to the second foil stage, and the second adhesive stage can be pressure sensitive and pre-applied to the first foil stage. Then, the third adhesive stage and second foil stage together form a first heat shield, and the second adhesive stage and first foil stage together form a first heat shield.

This permits forming the support means by selectively aligning the flexible circuit and first heat shield with the transducer support arm while applying heat and pressure, thus to form a first subassembly of the arm, circuit and first heat shield. Next, the second heat shield is aligned with the first subassembly and pressure is applied to form a second subassembly including the second heat shield attached to the first subassembly. Then, the first adhesive stage is applied to the first foil stage, and the integrated circuit is mounted onto the first adhesive stage. At that point the first adhesive stage is heat cured to complete the assembly.

The preferred first adhesive stage is a heat sink epoxy adhesive of a type available under the name "Bond Film 401K" from Ablestick Corp. An acrylic adhesive is suitable as the second adhesive stage, with the third and fourth adhesive stages preferably electrically and thermally insulative, and suited for bonding with the materials comprising the flexible circuit. One preferred adhesive, when the flexible circuit is composed of copper and a polyimide support film, is available under the brand name "Pyralux" from E. I. DuPont de Nemours & Co. The foil layers are preferably formed of aluminum.

When so formed, the support means provides an arrangement of alternatively thermally conductive and insulative layers, uniquely well suited to isolate the transducer support arm from its associated preamplifier, and further to dissipate heat in the transverse directions to further minimize any thermal expansion of the arm. In particular, the acrylic adhesive layer interrupts the radial progression of heat as it is conducted through the aluminum foil and thermally conductive adhesive layers, to spread the heat particularly throughout the aluminum foil layer forming the first foil stage and increasing the heat dissipated transversely of the first foil stage. In similar fashion, the third adhesive stage acts as an insulator to hinder longitudinal heat flow and promote transverse dissipation through an transversely outwardly of the second foil stage. The fourth adhesive stage effectively insulates the transducer support arm against heat entering the flexible circuit, which of course, has been substantially reduced due to the dissipation through and out of the foil stages.

Thus, the support means affords effective conduction of heat away from the preamplifier to enhance its operation, dissipates heat remotely of the preamplifier, and thermally isolates the transducer support arm to keep its thermal expansion to an acceptable level for maintaining accurate positional alignment of the data heads with the servo or positioning head. This result further is achieved well within limited space, particularly in the longitudinal direction, between adjacent support arms. In one preferred embodiment, the total thickness of all stages together with the flexible circuit is less than four-hundreths of an inch. The multiple support stages permit the application of tape-automated bonding techniques to the mounting of the preamplifier, at substantially reduced cost and at no sacrifice in efficiency and reliability in pulse transmission.

IN THE DRAWINGS

The above and other features and advantages are more readily appreciated upon considering the following detailed description and the drawings, in which.

DETAILED DESCRIPTION OF THE PREFERRED EMBODIMENT

Figure 1:
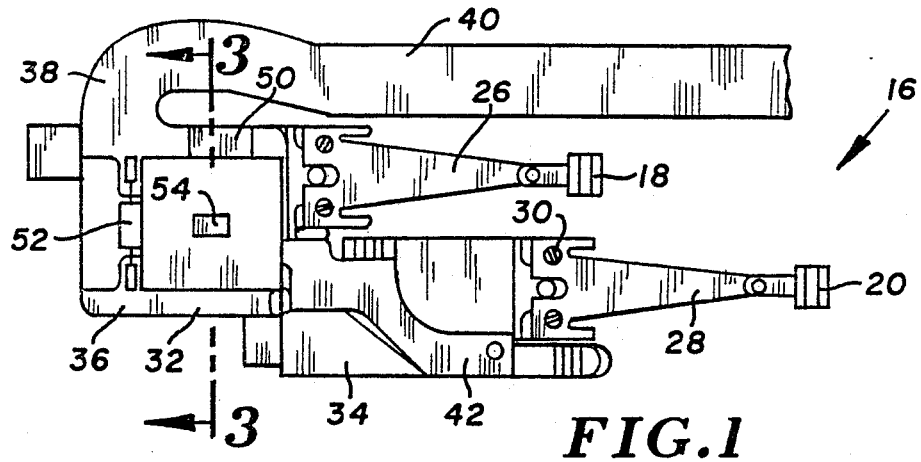
FIG. 1 is a top plan view of an assembly of transducing heads and a support arm configuration, with a preamplifier mounted in accordance with the present invention.
Figure 2:
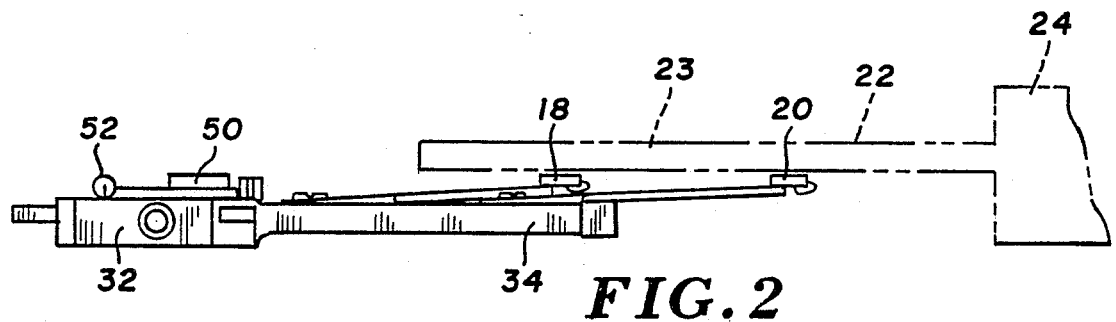
FIG. 2 is a side elevational view of the assembly of FIG. 1.

Turning now to the drawings, there is shown in FIGS. 1 and 2 a transducing head support assembly 16 used in a disc drive to selectively position magnetic data transducing heads 18 and 20 with respect to the recording surface 22 of a magnetic disc 23. The heads move linearly, or radially of the disc. The disc drive includes a hub 24 for rotating the disc about an axis which is vertical as viewed in FIG. 2. While only one disc is shown for convenience, it can be appreciated that hub 24 may support a plurality of discs in stacked, spaced apart relation, with each disc having its associated head support assembly. Typically in multiple disc arrangements, one of the discs and its associated transducing heads are dedicated to servo data or positioning data utilized to align the remaining transducing heads with selected data tracks on associated discs.

Figure 3:
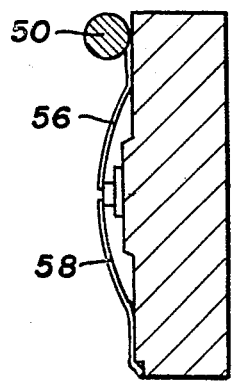
FIG. 3 is an enlarged sectional view taken along line 3—3 of FIG. 1.
Figure 4:
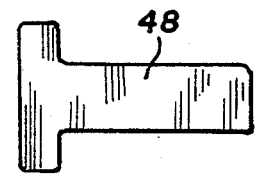
FIG. 4 is a top plan view of a heat shield employed in mounting the preamplifier.

Assembly 16 is constructed according to a two-head per surface linear actuator design, wherein a motor (not shown) moves the assembly, including heads 18 and 20, linearly or to the left and right as viewed in FIGS. 1 and 3. In combination with the rotation of the discs, this provides the necessary access to any selected point on recording surface 22 or another selected recording surface. When two heads are used as shown, each covers a selected portion of the disc radius to reduce the length of the range of reciprocal motion and thus reduce access time. The heads interact with the recording surface in the sense of placing data onto the surface, sensing data previously placed, and erasing such data.

Transducing head 18 is supported on a flexure arm 26, and head 20 likewise is supported on a flexure arm 28. The flexure arms elastically deform to permit rapid, minute adjustment of the heads to surface irregularities on disc 23. Screws 30 secure the flexible arms to a rigid arm or base 32 having a forward section 34 directly associated with flexure arm 28 and a rearward section 36 to which flexure arm 26 is secured. Rigid arm 32 normally is constructed of aluminum.

Figure 5:
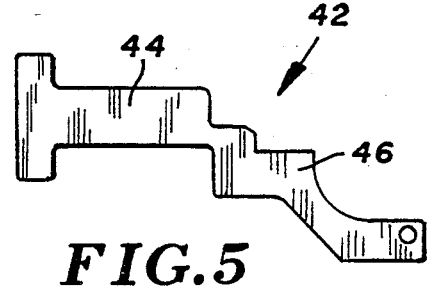
FIG. 5 is a top plan view of another heat shield employed in mounting the preamplifier.

A flexible circuit 38 is mounted directly to the substantially planar top surface of rigid arm 32, and is electrically connected to heads 18 and 20 in a manner known in the art and not further described. A portion 40 of the flexible circuit extends along one side of head support assembly 16, for connection to the stationary electrical circuitry within the drive (not shown). This portion of the flexible circuitry yields to allow the required reciprocal motion of the assembly. A lower heat shield 42, shown separately in FIG. 5, is attached directly over flexible circuit 38. The lower heat shield includes a generally "T" shaped segment 44 and an irregular portion 46 which, particularly to the area of forward arm section 34, substantially conforms to the shape of flexible circuit 38. An upper heat shield 48 has a size and shape corresponding to the "T"-shaped segment of the lower heat shield, and is mounted directly onto that segment. Certain electrical elements such as a jumper line 50 and a resistor 52 are mounted to assembly 16 and cooperate with the flexible circuitry.

Directly on upper heat shield 48 is a tape-automated bonded preamplifier 54 in the form of an integrated circuit chip. A plurality of leads are connected to conductive pads on the chip and extend outwardly for connection with flexible circuit 38. Two such leads are shown at 56 and 58 in FIG. 3, with the remaining leads being shown somewhat schematically in FIG. 1. Flexible circuit 38 is a known combination of conductive paths typically formed of copper, and a flexible dielectric material that supports the conductive pads and isolates them from one another, for example a polyimide available under the brand name "Kapton".

Preamplifier 54 when operating generates heat which must be dissipated or otherwise prevented from reaching rigid arm 32. Otherwise, the arm experiences an unacceptable level of thermal growth or expansion due to increased temperature, which of course influences the position of transducing heads 18 and 20 relative to the data tracks on recording surface 22. In rotary actuators, where the arm extension is generally tangential to the concentric data tracks, a slight timing error can arise. In a linear actuator, the arm extension tends to be radial, or perpendicular to the tangent, in which case the change in transducing head position results in misalignment relative to the selected data track. The potential for misalignment is always present in an arrangement of stacked discs, as heat reaching various head support assemblies, and their resulting amounts of thermal expansion, inevitably vary.

Figure 6:
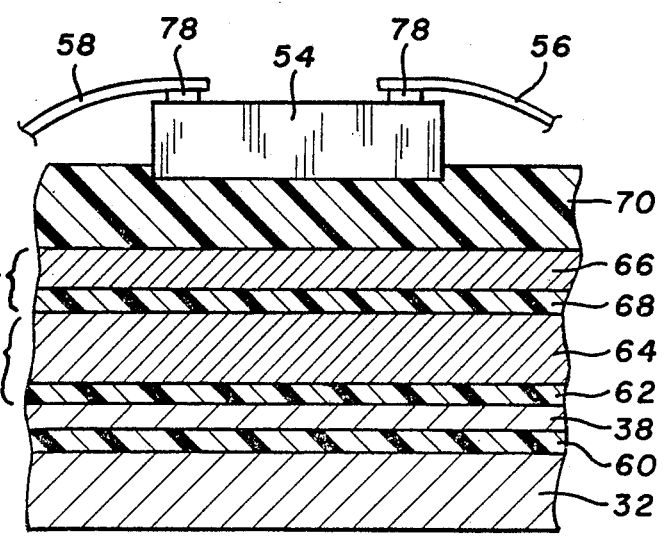
FIG. 6 is a further enlarged sectional view of a portion of FIG. 3.
Figure 7:
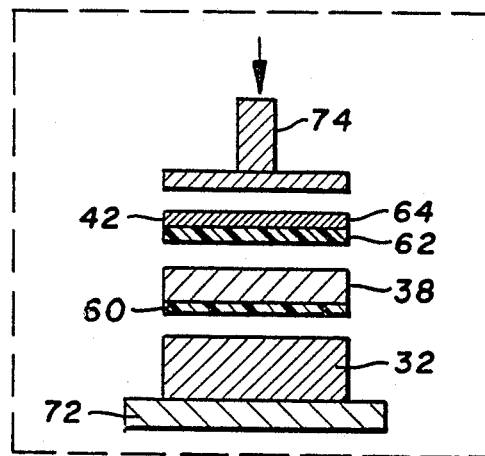
FIGS. 7 through 10 are diagrammatic views showing a process for mounting the preamplifier with respect to the transducer support arm.

One approach in countering this tendency has been to encase the preamplifier within a ceramic package, and mount the package itself in spaced apart relation to the fixed arm. Tape-automated bonding, however, is substantially less costly than the ceramic package approach, and is possible in view of the stacked arrangement of heat shields 42 and 48 shown in FIG. 6. Flexible circuit 38 is a combination of copper circuits and the dielectric supporting material (e.g. Kapton) and has a nominal thickness of about 15-thousandths of an inch (0.015). The flexible circuitry is secured to rigid arm 32 by a thermally and electrically insulative adhesive stage or layer 60 approximately one one-thousandth of an inch (0.001) thick. Adhesive 60 is thermally and electrically insulative, and, due to the nature of flexible circuit 38, is particularly well suited for bonding the copper and polyimide combination to aluminum, e.g. an adhesive sold under the brand name "Pyralux". Lower heat shield 42 includes an adhesive stage 62 also preferably "Pyralux" and about one one-thousandth of an inch (0.001) thick, together with an aluminum foil stage 64 with a nominal thickness of about four-thousandths of an inch (0.004).

Upper heat shield 48 includes an aluminum foil stage 66 approximately three-thousandths of an inch (0.003) thick, and a thermally insulative epoxy adhesive stage 68 (e.g. acrylic) having a nominal thickness of about two-thousandths of an inch (0.002). While acrylic is preferred, adhesive stage 68 should in any event be thermally insulative, although it need not be electrically insulative.

Directly above foil stage 66 is a final, heat sink epoxy adhesive stage 70 for securing preamplifier 54, preferably electrically insulative and thermally conductive, to allow the desired grounding yet efficiently conduct heat from the preamplifier. Adhesive stage 70 is about five-thousandths of an inch thick, and can be, for example, an adhesive offered under the name "Bond Film 401K".

The multiple stage support for the preamplifier is constructed in accordance with a process illustrated in FIGS. 7 through 10. Directing atention to FIG. 7, rigid arm 32 is placed in a fixture 72, then flexible circuit 38 and lower heat shield 42 are aligned with and positioned upon the arm in succession. A longitudinally moveable platen 74 or other means applies an appropriate amount of pressure while the subassembly is heated within a chamber 76 to a selected temperature appropriate for curing the adhesive. When Pyralux adhesive is employed, the temperatures is preferably about 350° and the pressure is at least five psi. It should be noted that flexible circuitry is commercially available with Pyralux adhesive or an equivalent already applied, in particular having been previously applied in a partially cured or "B" stage. Lower heat shield 42 can be similarly prefabricated.

Figure 8:
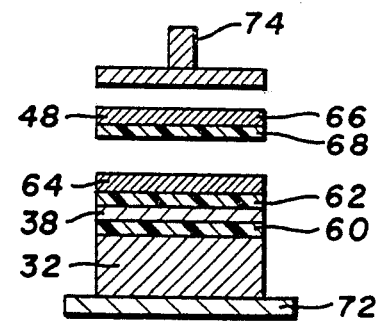
Figure 9:
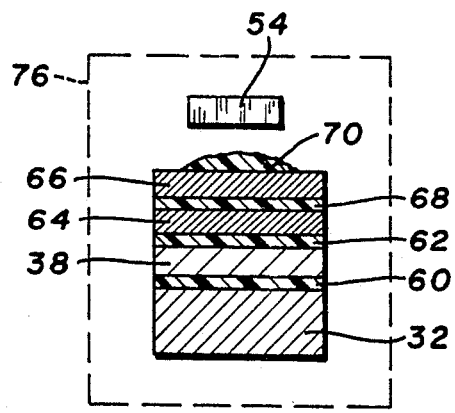
Figure 10:
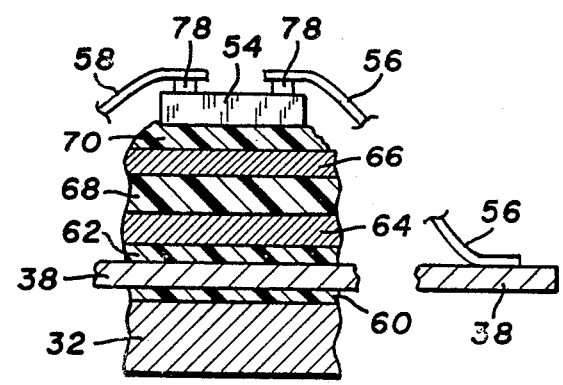

Upper heat shield 48 is mounted to the subassembly employing pressure alone as illustrated in FIG. 8, as acrylic stage 68 is pressure sensitive. Following attachment of the upper heat shield, heat sink epoxy stage 70 is applied in the form of an appropriately sized spot or dot upon the upper heat shield, whereupon preamplifier chip 54 is placed upon this adhesive stage, and the full assembly is subjected to heat for curing the heat sink epoxy. Finally, the wire bonding between pads 78 of preamplifier chip 54 and the flexible circuit 38 is completed, preferably with automatic wire bonding equipment.

A multiple stage mounting thus supports the preamplifier chip, rapidly extracts heat generated within the chip and insulates the head support arm to substantially prevent thermal expansion. Adhesive stage 70 and aluminum foil stage 66 readily and rapidly conduct heat away from the preamplifier chip. Adhesive stage 68 of the upper heat shield, however, presents a barrier to longitudinal heat transfer (vertical as viewed in FIG. 6), and thus encourages lateral or horizontal conduction outwardly of the chip. Lower heat shield 42 functions in a similar fashion, with foil stage 64 promoting heat conduction in all directions and with adhesive stage 62 resisting longitudinal transfer, again promoting lateral transfer or dissipation of the heat.

In practice, it has been found that heat shields 42 and 48, in cooperation with upper adhesive stage 70, insure a rapid conduction and effective dissipation of heat which keeps thermal expansion of the rigid arm well within acceptable limits. A further benefit is a more rapid removal of heat from the preamplifier chip, with junction temperatures at the preamplifier found to be typically 15° to 20° lower than such temperatures for the ceramic package approach. The result is a longer life and more reliable operation of the preamplifier.

It can be readily appreciated that heat shields 42 and 48 provide a unique stacking arrangement of alternatively heat insulative and heat conductive layers, which shape the temperature distribution about preamplifier 54 in a manner to avoid heat concentrations or hot spots that would occur at the rigid arm longitudinally of or below the center of the preamplifier chip. This redistribution is believed to be a primary factor in permitting the combination of rapid removal of heat from the preamplifier and effective insulation of the head supporting arm.

What is claimed is:

1. In a magnetic transducing apparatus including a substantially rigid transducer support arm movable with respect to a magnetic data recording surface, a magnetic transducing head mounted to the arm for movement with the arm and positioned for interaction with the recording surface, an integrated circuit mounted with respect to the arm, a flexible electrical circuit electrically connected to the transducing head and to the integrated circuit, said flexible circuit mounted with respect to the arm between the arm and the integrated circuit, a means for mounting the integrated circuit to thermally isolate the integrated circuit from the arm and dissipate heat generated in the integrated circuit, said mounting means including:

a plurality of mounting stages cooperating to support the integrated circuit in longitudinally spaced apart relation to the transducer support arm, each of said stages disposed with its major dimensions substantially in a lateral plane, said stages comprising:

first and second thermally conductive foil stages between said integrated circuit and said flexible circuit;

an electrically insulative and thermally conductive first adhesive stage between said integrated circuit and said first foil stage for bonding the integrated circuit with respect to the first foil stage;

a thermally insulative second adhesive stage between said first and second foil stages for bonding the first and second foil stages with respect to one another;

a thermally and electrically insulative third adhesive stage between the second foil stage and the flexible circuit for bonding the second foil stage with respect to the flexible circuit; and a thermally insulative fourth adhesive stage between the flexible circuit and the transducer support arm for bonding the flexible circuit with respect to the arm.

2. The mounting means of claim 1 wherein:
the arm is constructed of aluminum and the third and fourth adhesive stages are electrically insulative.

3. The mounting means of claim 2 wherein:
each of said stages is substantially uniform in its longitudinal dimension, and the lateral dimensions of each stage are at least one hundred times the associated longitudinal dimension.

4. The mounting means of claim 3 wherein:
said first and second foil stages are formed of aluminum.

5. The mounting means of claim 4 wherein:
said fourth adhesive stage is pressure and temperature sensitive and pre-applied to said flexible circuit in a partially cured state; said third adhesive stage is pressure and temperature sensitive and is pre-applied in a semi-cured form to said second foil stage whereby said third adhesive stage and second foil stage comprise a first heat shield; and said second adhesive stage is a pressure sensitive epoxy adhesive pre-applied to said first foil stage whereby said second adhesive stage and first foil stage comprise a first heat shield; and wherein said mounting means is formed by selectively aligning said flexible circuit and said first heat shield with said transducer support arm and applying heat and pressure to form a subassembly comprising said arm, flexible circuit and first heat shield;

aligning said second heat shield with the subassembly and applying pressure to attach the second heat shield to the first subassembly;

applying the first adhesive stage to the first foil stage and mounting the integrated circuit onto the first adhesive stage; and heat curing the first adhesive stage to fix the integrated circuit with respect to the first foil stage.

6. The mounting means of claim 4 wherein:
said first adhesive stage comprises a heat sink epoxy adhesive, said second adhesive stage consists of an acrylic resin, and said third and fourth adhesive stages consist of an electrically and thermally insulative adhesive formulated for bonding aluminum to the flexible circuit.

7. In a magnetic transducing apparatus including a transducer support arm movable with respect to a magnetic data recording surface, a magnetic transducing head mounted to the arm for movement with the arm and positioned to interact with the recording surface, a flexible electrical circuit means mounted to the arm and electrically connected to the transducing head, and an integrated circuit mounted with respect to the arm and flexible circuit and electrically connected to the flexible circuit, wherein the improvement comprises:

a plurality of heat shield members in stacked relation between said integrated circuit and flexible circuit means for supporting the integrated circuit in longitudinally spaced relation to the flexible circuit means and said support arm, each of said shields disposed with its major dimensions substantially in a lateral plane and being substantially uniform in longitudinal section;

each of said shielding members consisting essentially of a laterally extended thermally conductive layer forming a side of the shield facing the integrated circuit, and a laterally extended thermally insulative layer adjacent the thermally conductive layer and forming a side of the shield facing the flexible circuit; and an adhesive means for securing the integrated circuit with respect to the thermally conductive layer of the shielding member disposed adjacent the integrated circuit.

8. The apparatus of claim 7 wherein:
said adhesive means comprises an electrically insulative and thermally conductive epoxy adhesive.

9. The apparatus of claim 7 wherein:
the lateral dimensions of each of said layers of said shielding members are at least 100 times the longitudinal thickness of each layer.

10. The apparatus of claim 9 wherein:
the thickness of the thermally conductive layer of each shield is in the range of from one to five times the thickness of its associated thermally insulative layer.

11. The apparatus of claim 7 wherein:
said thermally insulative layers of said heat shield members are adhesive.

* * * * *